United States Patent [19]

Soong et al.

[11] Patent Number: 5,729,066
[45] Date of Patent: Mar. 17, 1998

[54] COMBINED RADIAL AND AXIAL MAGNETIC BEARINGS

[75] Inventors: Wen Liang Soong, Schenectady; James Patrick Lyons; Gerald Burt Kliman, both of Niskayuna, all of N.Y.

[73] Assignee: General Electric Company, Schenectady, N.Y.

[21] Appl. No.: 532,288

[22] Filed: Sep. 22, 1995

[51] Int. Cl.$^6$ ........................................... H02K 7/09
[52] U.S. Cl. ................... 310/90.5; 310/67 R; 310/68 B; 310/51; 324/207.25
[58] Field of Search ........................... 310/90.5, 67 R, 310/68 B, 51; 324/207.25

[56] References Cited

U.S. PATENT DOCUMENTS

| | | | |
|---|---|---|---|
| 4,483,570 | 11/1984 | Inoue | 308/10 |
| 4,882,837 | 11/1989 | Higuchi | 29/719 |
| 5,117,448 | 5/1992 | Penato et al. | 378/132 |
| 5,347,190 | 9/1994 | Lewis et al. | 310/90.5 |

FOREIGN PATENT DOCUMENTS

3343-186-A  6/1985  Germany.
58-184319-A  4/1982  Japan.

*Primary Examiner*—Thomas M. Dougherty
*Assistant Examiner*—Timothy A. Williams
*Attorney, Agent, or Firm*—Ann M. Agosti; Marvin Snyder

[57] ABSTRACT

In a five-axis magnetic bearing, each of two combined radial and axial magnetic bearing structures includes a radial magnetic stator and a radial magnetic rotor. A shaft supports the rotors of the bearing structures. Each rotor and stator have an asymmetrical orientation such that the bearing structure is capable of creating a force in an axial direction when the bearing structure is excited. A creatable axial force of a first one of the bearing structures is capable of being in sufficient opposition to a creatable force of a second one of the bearing structures so as to maintain the shaft assembly in a desired axial position. The asymmetrical orientation may include, for example, a rotor being physically offset from a stator or a spatial distinction between a surface region of a respective rotor and a surface region of a respective stator. Examples of spatial distinctions include material extensions, notches, and holes. Each bearing structure can be controlled by four stator portions (actuators) with each actuator being supplied with current signals representative of a common mode axial force command and a respective differential radial force command.

12 Claims, 6 Drawing Sheets

COMBINED RADIAL AND AXIAL MAGNETIC BEARINGS

BACKGROUND OF THE INVENTION

Magnetic levitation of a rotating motor shaft assembly generally requires two radial magnetic bearings and one axial magnetic bearing. In environments wherein the required axial thrust forces on a rotating motor shaft are smaller than the radial forces, attempts have been made to combine an axial bearing into a radial bearing to eliminate the need for a separate axial magnetic bearing. In one approach, as described in A. M. Mohamed and E. P. Emad, "Conical Magnetic Bearings with Radial and Thrust Control," Proc. of the 28th Conf. on Decision and Control, Tampa, Fla., December 1989, pp. 554–61, both the rotor and the stator of a bearing assembly are tapered in a conical manner to create a bearing force having a controllable axial component. A limitation of this technique is increased manufacturing complexity and difficulty of assembly.

SUMMARY OF THE INVENTION

It would be desirable to be able to combine an axial bearing into a radial bearing without requiring a tapered airgap surface. In the present invention the area of overlap between a stator and rotor pair is caused to be asymmetrical and thereby create a force in a direction perpendicular to the radial force (i.e., in an axial direction).

BRIEF DESCRIPTION OF THE DRAWINGS

The features of the invention believed to be novel are set forth with particularity in the appended claims. The invention itself, however, both as to organization and method of operation, together with further objects and advantages thereof, may best be understood by reference to the following description taken in conjunction with the accompanying drawings, where like numerals represent like components, in which:

DETAILED DESCRIPTION OF PREFERRED EMBODIMENTS OF THE INVENTION

In the present invention the area of overlap in a radial bearing between a stator and a rotor is caused to be asymmetrical and thereby create a force in the axial direction when the bearing is excited. As discussed below, the asymmetrical orientation can be created by offsetting conventional stators and rotors or by physically altering the surface regions (the surfaces and the area underlying the surfaces) of the stator/rotor pairs to create spatial distinctions between the surface regions.

Figure 1:
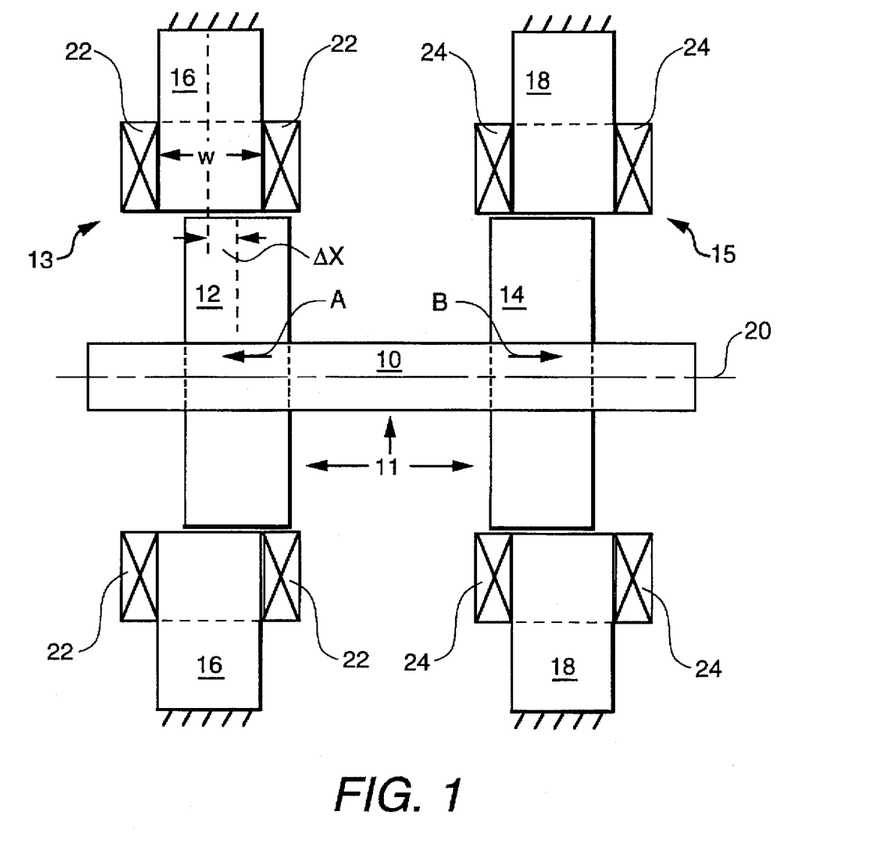
FIG. 1 is a sectional side view of radial magnetic bearings with stators offset from rotors.

FIG. 1 is a sectional side view showing a five-axis magnetic bearing including a shaft assembly 11 and two bearing structures 13 and 15. The shaft assembly includes a shaft 10 and rotors 12 and 14 which are offset from being aligned with respective stators 16 and 18. This embodiment can use conventional magnetic stators with windings 22 and 24 such as those having C core or E core structures or of a homopolar variety. Each bearing structure includes a rotor, a stator, and associated windings. In one embodiment, shaft 10, rotors 12 and 14, and stators 16 and 18 may comprise solid or laminated iron or steel, for example.

Because the rotors and stators are not axially aligned, axial forces having directions represented by arrows A and B result. By offsetting the rotors in different directions (in FIG. 1 rotor 12 is shifted right and rotor 14 is shifted left), the resulting axial forces are in opposite directions and can be controlled to keep the shaft assembly, and thus the rotors in a desired axial position.

Figure 1A:
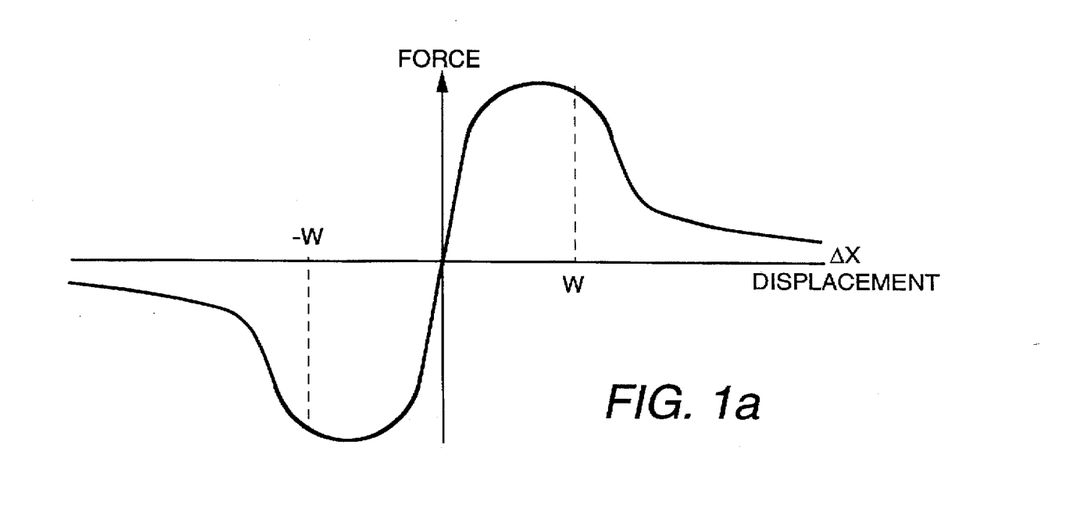
FIG. 1A is a graph showing expected tangential force versus displacement for an asymmetrical rotor/stator pair.

FIG. 1A is a graph illustrating a variation of tangential force for one rotor/stator pair with displacement $\Delta x$ (the offset distance) of the overlap of the rotor and stator pole pieces. The force is zero when the pole pieces are perfectly aligned, and therefore, the pole pieces attempt to align when displaced. The force is relatively constant and independent of position as long as there remains some overlap of the pole pieces. When the displacement is greater than the width w of the pole pieces, the poles pieces thus do not overlap and the axial force becomes small.

The radial force production is highest when the pole pieces are fully aligned whereas the axial force is maximized when the pole pieces are displaced by about one half a pole piece width. As a compromise, a suitable displacement is about one quarter (¼) to one third (⅓) of a pole piece width. The optimum displacement for a particular design is dependent on the magnetic dimensions and the ratio between the required radial and axial forces. This optimum value can be found using non-linear finite-element analysis of the proposed design. One book that discusses non-linear finite-element analysis is *Computer-Aided Design in Magnetics*, D. A. Lowther and P. P. Silvester, Springer-Verlag (1985).

The physical offset invention shown in FIG. 1 is advantageous because conventional rotor and stator shapes can be used. The physical offset, however, reduces the overlapping area of the stator and rotor which thus results in a reduction of the radial force capability of the bearing. If this force reduction is problematic for a particular motor design or if it is desired to physically align the rotors and stators, the embodiments shown in FIGS. 2–6 can be used. FIGS. 2–6 illustrate implementations of the present invention in which a stator and rotor are physically aligned but selected modifications to the stator and rotor have been made to produce a physical asymmetry and thereby create the desired axial force. Such embodiments each require a more complicated rotor and stator fabrication process than the embodiment of FIG. 1.

Figure 2:
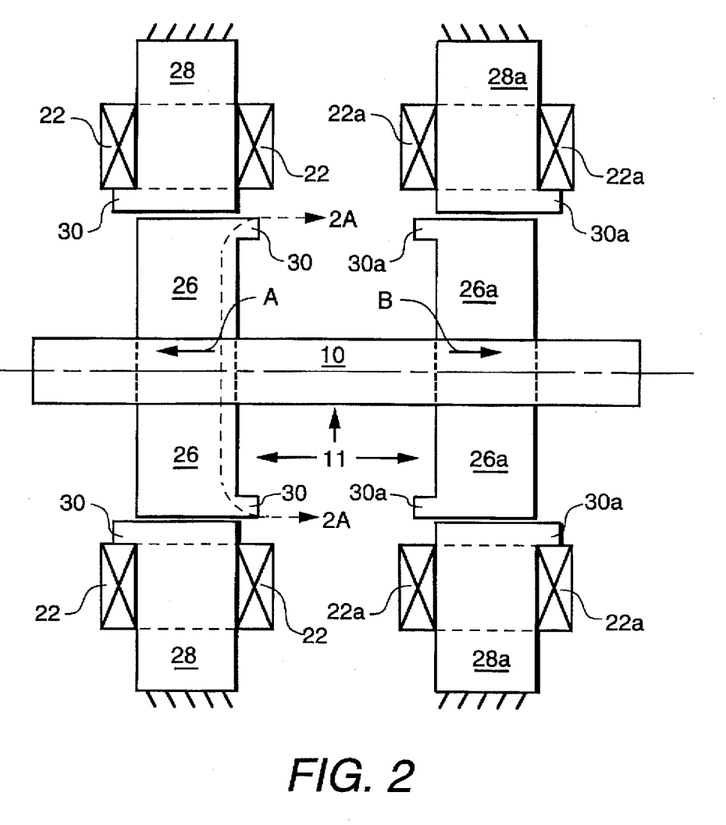
FIG. 2 is a sectional side view of a stator and rotor pair having material extensions.
Figure 2A:
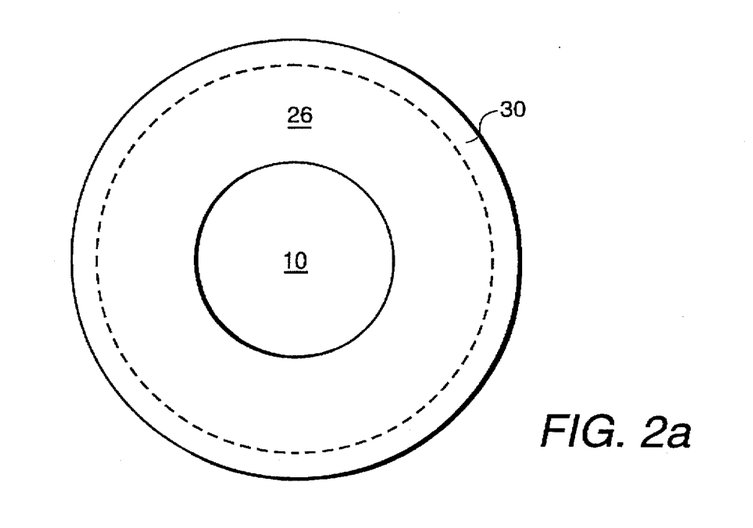
FIG. 2A is a front view along line 2A—2A of the rotor shown in FIG. 2

FIG. 2 is a sectional side view illustrating a stator 28 and rotor 26 pair having material extensions 30. As shown by the cross sectional view of rotor 26 in FIG. 2A, each extension 30 preferably extends around a surface of the rotor to form a circle in order to minimize the variation of radial or axial force with rotation or axial motion of the rotor. An axial force is produced by the tendency of rotor 26 to move in the leftward direction A so that the surface areas of rotor 26 and stator 28 become aligned (including the extensions).

A corresponding pair of rotor 26a and stator 28a are present to create an axial force in the opposite direction B of the force created by rotor 26 and stator 28. To create the axial force in an opposing direction, the nature of the asymmetry is interchanged. Rotor 26a and stator 28a have extensions 30a positioned on the opposite surfaces with respect to the positioning of extensions 30 on rotor 26 and stator 28 to thereby cause the rotor 26a to tend to move in the rightward direction. For the reasons discussed above with respect to FIGS. 1 and 1A, the length of extensions 30 is preferably in the range of one quarter to one third the length of the overlapping surface area of the stator and rotor and the thickness is comparable to the length. In one embodiment, the extensions are fabricated from stacks of laminations bolted to the sides of the rotor and stator.

Figure 3:
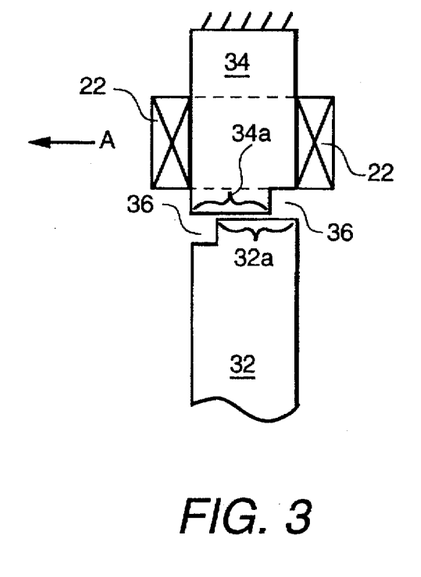
FIG. 3 is a partial view of a stator and rotor pair having notches.

FIG. 3 is a partial view of a stator 34 and rotor 32 pair having notches 36. In this embodiment, surfaces 32a and 34a tend to align, so an axial force is created in direction A. Preferably, a notch has a width of about ⅙th to ⅛th of the width of the rotor/stator surface width and a notch depth comparable to the notch width.

If the stator and rotor are assembled in the typical manner of stacking laminations, the notches can be formed by using lamination stacks having different diameters, for example. The lamination stack which has the smaller diameter of the two stacks can form the notched portion of the respective stator or rotor.

Electromagnetically, the embodiment of FIG. 2 is advantageous because the axial force component is produced with less loss of radial force than the embodiment of FIG. 3. The embodiment of FIG. 2 can be more difficult to fabricate, however, than the embodiment of FIG. 3.

Figure 4:
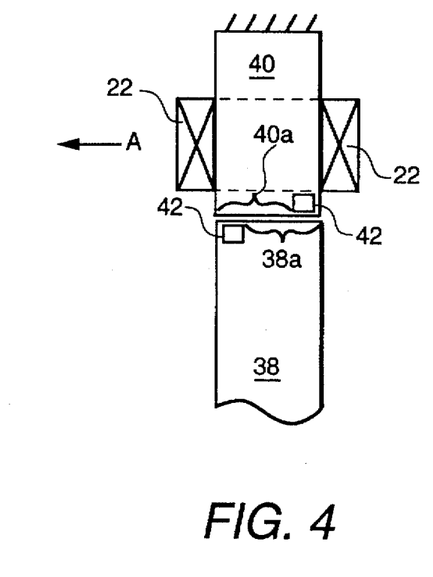
FIG. 4 is a partial view of a stator and a rotor each having a hole.

FIG. 4 is a partial view of a stator 40 and a rotor 38 each having a hole 42. In this embodiment, surfaces 38a and 40a tend to align, so an axial force on the rotor is created in direction A. The holes are designed to be as close to the surface and side of the rotor and stator as mechanically practical, so that the embodiment of FIG. 4 magnetically emulates the embodiment of FIG. 3.

Figure 4A:
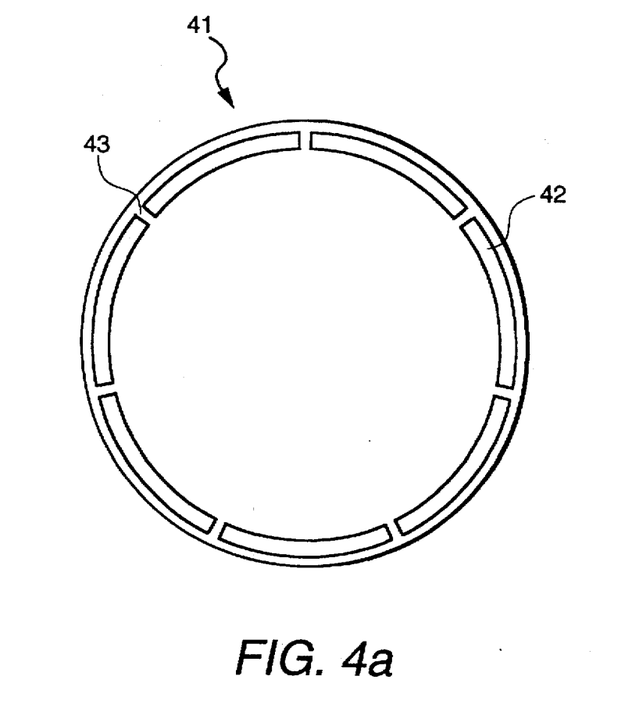
FIG. 4A is a front view of a rotor lamination useful in the embodiment of FIG. 4.

The stator and rotor can be fabricated in a similar manner as the stator and rotor in FIG. 3. In one lamination design, as shown in FIG. 4A, the laminations 43 in the region of each hole 42 are constructed having thin bridges 43 which are useful because a hole can not extend completely around a single piece lamination due to the need for some means of attaching the perimeter to the center.

An advantage of the embodiment of FIG. 4 is that, because the holes are below the surfaces, a smooth airgap can be maintained between the rotor and stator. FIG. 4 has a more complex lamination design than FIG. 3 and has less force capability because of increased magnetic leakage.

Figure 5:
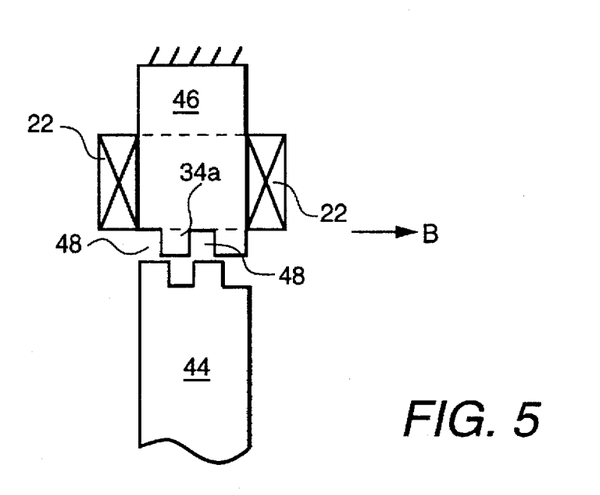
FIG. 5 is a partial view of a stator and rotor pair having slots.
Figure 6:
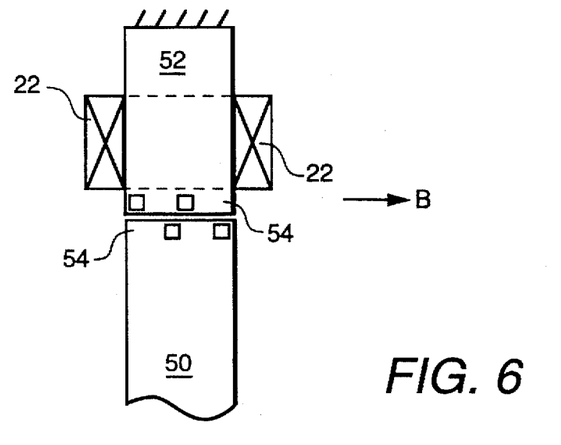
FIG. 6 is a partial view of a stator and a rotor each having a plurality holes.

FIG. 5 is a partial view of a stator 46 and rotor 44 pair having slots 48, and FIG. 6 is a partial view of a stator 52 and a rotor 50 each having a plurality holes 54. In each of FIGS. 5 and 6, an axial force on the rotor is created in direction B. FIG. 5 extends the concept shown in FIG. 3 by using a plurality of slots in the rotor and stator. In the same way FIG. 6 extends the concept shown in FIG. 4 by using a plurality of holes in the rotor and stator. Increasing the number of holes or slots increases the axial force (and decreases the radial force). The design considerations for a particular application are best determined by finite-element analysis. Slots 48 and holes 54 can be fabricated in a similar manner as discussed with respect to notches 36 and holes 42, respectively.

With a sufficiently large magnetic offset between rotor and stator, the axial force (which depends on the current) is nearly independent of small changes in position such that the system has no inherent stiffness. In practice, second order effects of fringing and saturation can cause some variation of force with position but such variation is small. An electronic control can be used to maintain a given rotor axial position by sensing information on position and adjusting the current to the bearing structures through the stator windings to create the force needed to maintain the desired position. Appropriate position sensors may comprise commercially-available eddy-current position sensors, as well as inductive sensors, optical sensors, and capacitive sensors, for example.

Figure 7:
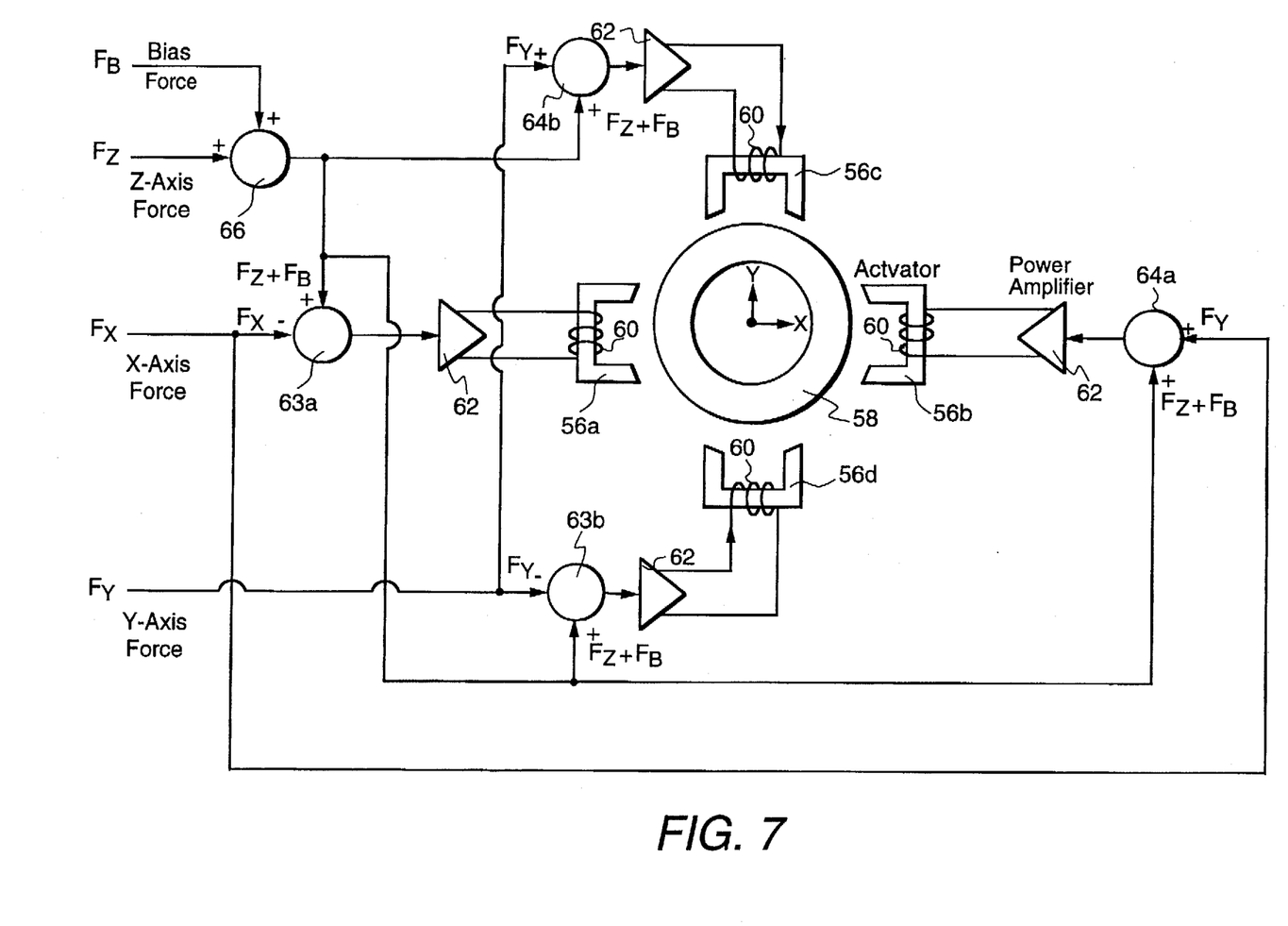
FIG. 7 is a front view of an embodiment for magnetizing bearings of the present invention.
Figure 8:
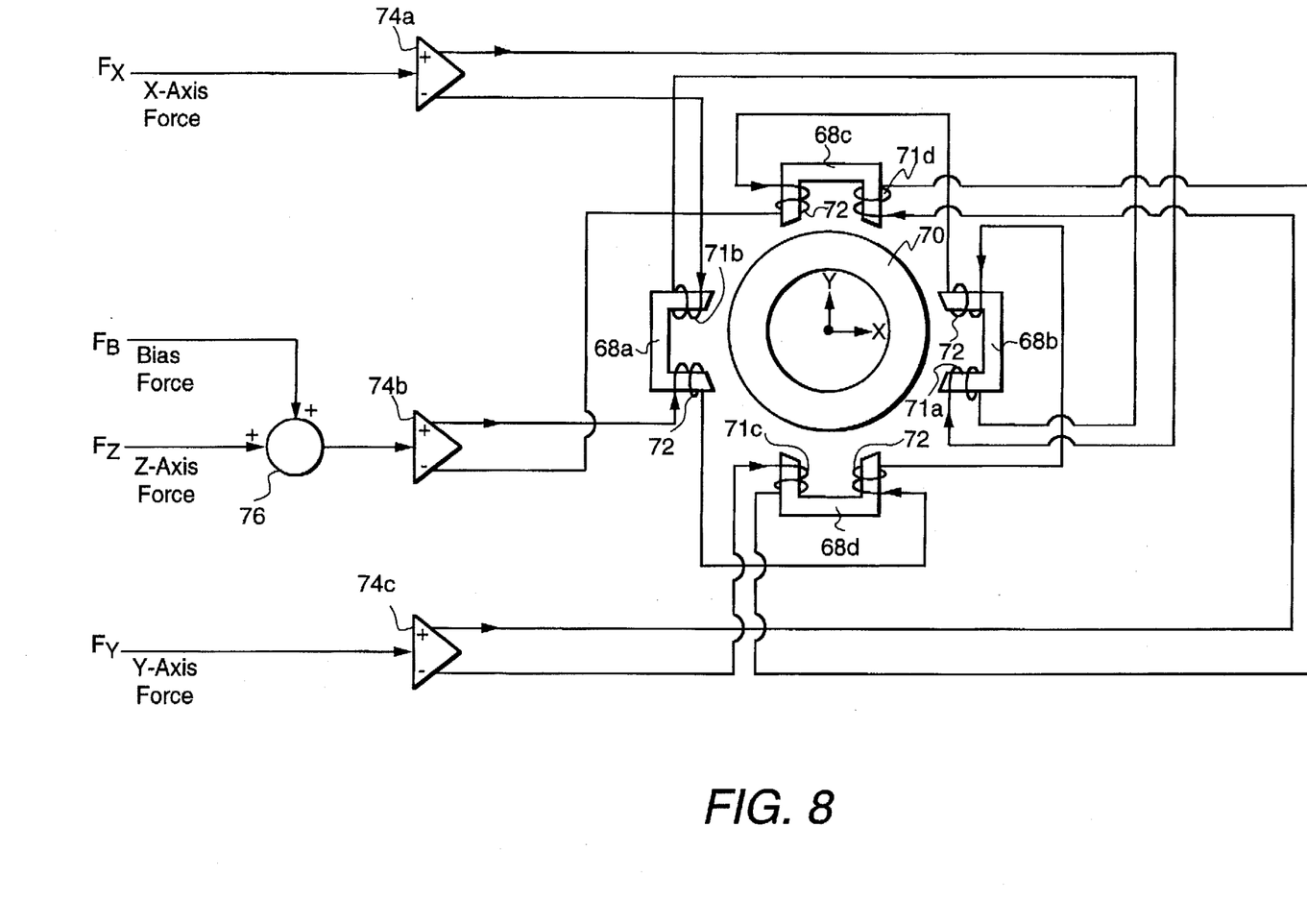
FIG. 8 is a front view of another embodiment for magnetizing bearings of the present invention.

The control of the magnetic bearings can be accomplished by designing each stator to comprise a plurality of actuators as shown in FIGS. 7 and 8 to supply force commands for each bearing: the x-axis and y-axis radial force commands, the z-axis axial force command, and a bias axial force command. The bias force is not essential but is useful for improving the force versus current linearity of the actuators and thereby simplifying the control algorithms as discussed in *Active Magnetic Bearings*, G. Schweitzer, H. Bleuler, A. Traxler, ETH Zurich (1994).

For both embodiments of FIGS. 7 and 8, axial force commands (shown as being on the z-axis) are applied to all the actuators in a common-mode fashion while radial force commands (shown as being on the x-axis and y-axis) are applied differentially. To increase the axial force, the current in all the actuators can be increased. The term "differential radial force command" is meant to encompass a force command for a positive or negative axis (such as the positive x axis) that differs from the corresponding force command for the other portion of the axis (such as the negative x axis).

For example, to increase the radial force in the positive x or y direction, the current in the positive x or y axis actuator can be increased while the current in the negative x or y axis actuator can be decreased, as described below with respect to the discussion of FIGS. 7 and 8.

FIG. 7 is a view of an embodiment for magnetizing (exciting) a bearing of the present invention comprising rotor 58, a stator including four actuators 56a, 56b, 56c, and 56d, and one winding 60 per respective actuator. One amplifier 62 is used per respective actuator. Thus for each bearing, a total of four amplifiers are used. The axial force and bias force commands are electronically added by summer 66 to become the common-mode signal which is supplied to the respective winding of each of the actuators. The radial force command is supplied differentially to the two actuators in each axis.

In the embodiment of FIG. 7, the differential application of the radial force command is obtained by using two summers 64a and 64b, one for each of actuators 56b and 56c on the positive x and y axes, respectively, and two subtractors 63a and 63b, one for each of actuators 56a and 56d on the negative x and y axes, respectively. The summers and subtractors send their output signals to the respective one of the amplifiers 62 which in turn amplifies the signal before supplying the current to a respective winding 60.

Preferably, the actuators are spaced ninety degrees apart around the rotor with the positive x axis actuator 56b neighboring positive y axis actuator 56c and negative y axis actuator 56d such that the positive x axis is oriented 180 degrees from the negative x axis and the positive y axis is oriented 180 degrees from the negative y axis.

The signal for the positive x axis will thus be an amplified current including the sum of the currents commanded by force commands Fz+Fb+Fx, whereas the signal for the negative x axis will be an amplified current including the currents commanded by force commands Fz+Fb minus the current commanded by force command Fx.

Likewise, the signal for the positive y axis will be an amplified current including the sum of the currents commanded by force commands Fz+Fb+Fy, whereas the signal for the negative y axis will be an amplified current including the currents commanded by force commands Fz+Fb minus the current commanded by force command Fy.

FIG. 8 illustrates an implementation using only three amplifiers 74a, 74b, and 74c but requiring two windings on each actuator 68a, 68b, 68c, and 68d to control the position of a rotor 70. The embodiment of FIG. 8 requires fewer amplifiers than the structure of FIG. 7 but will have higher copper losses in the actuators than in the embodiment of FIG. 7.

One common bias/axial force amplifier 74b can drive one winding 72 in each of the four actuators in series (as shown), in parallel (not shown), or in an a combination of series and parallel arrangement (not shown). The other two amplifiers 74a and 74c differentially control the x and y axes, respectively, by supplying current to windings 71a, 71b, 71c, and 71d.

Amplifier 74a, for example, sends a positive signal to winding 71a of actuator 68b and a negative signal to winding 71b of actuator 68a such that the signal on the windings for the positive x axis will be a current including the sum of the currents commanded by force commands Fz+Fb+Fx, whereas the signal on the windings for the negative x axis will include the currents commanded by force commands Fz+Fb minus the current commanded by force command Fx.

Amplifier 74c sends a positive signal to winding 71d of actuator 68c and a negative signal to winding 71c of actuator 68d such that the signal on the windings for the positive y axis will be a current including the sum of the currents commanded by force commands Fz+Fb+Fy, whereas the signal on the windings for the negative y axis will include the currents commanded by force commands Fz+Fb minus the current commanded by force command Fy.

FIGS. 7 and 8 show analog controller implementations illustrative of the control principles used in the present invention. A digital implementation can be used wherein the control equations are solved in a microprocessor which then controls the amplifiers. The advantage of using a microprocessor is that greater flexibility in the control algorithm can be applied. Additionally, compensation can be made for imperfections in the force versus current characteristics of the actuators. Furthermore, a digital implementation also permits more than four actuators per bearing, a feature which can be used to provide fault-tolerance as described in Lyons et al., U.S. Pat. No. 5,300,843, issued Apr. 5, 1994.

While only certain preferred features of the invention have been illustrated and described herein, many modifications and changes will occur to those skilled in the art. It is, therefore, to be understood that the appended claims are intended to cover all such modifications and changes as fall within the true spirit of the invention.

What is claimed is:

1. A five-axis magnetic bearing including:
    two combined radial and axial magnetic bearing structures, each of the bearing structures comprising
        a radial stator, and
        a radial rotor,
            the rotor and stator having an asymmetrical orientation such that the bearing structure is capable of creating a force in an axial direction when the bearing structure is excited; and
    a shaft assembly including a shaft supporting the rotors of the bearing structures,
    wherein the magnetic bearing structures are capable of producing opposing axial forces which can be controlled to maintain the shaft assembly in a desired axial position.

2. The magnetic bearing of claim 1, wherein each asymmetrical orientation comprises a respective rotor being physically offset from a respective stator, the rotor of the first bearing structure being offset in a direction opposite from the rotor of the second bearing structure.

3. The magnetic bearing of claim 2, wherein an offset distance of a respective rotor has a range of one quarter to one third of the width of the respective rotor.

4. The magnetic bearing of claim 1, wherein each asymmetrical orientation comprises a spatial distinction between a surface region of a respective rotor and a surface region of a respective stator.

5. The magnetic bearing of claim 4, wherein the spatial distinction comprises a material extension of the surface region of a respective rotor or a respective stator.

6. The magnetic bearing of claim 4, wherein the spatial distinction comprises material extensions of the surface regions of the respective rotor and the respective stator, the material extension of the respective rotor being situated on an opposite side of the material extension of the respective stator.

7. The magnetic bearing of claim 4, wherein the spatial distinction comprises notches in the surface regions of the respective rotor and the respective stator, the notch of the respective rotor being situated on an opposite side of the notch of the respective stator.

8. The magnetic bearing of claim 4, wherein the spatial distinction comprises at least one hole in each of the surface regions of the respective rotor and the respective stator.

9. The magnetic bearing of claim 1, wherein each stator comprises a plurality of actuators and each bearing structure is capable of supplying each actuator with a respective one of a plurality of current signals representative of a common mode axial force command and a respective differential radial force command.

10. The magnetic bearing of claim 9, wherein each stator comprises four actuators and each bearing structure further comprises
    four amplifiers, each amplifier coupled to a respective one of the actuators through a respective winding,
    a first summer for adding a first radial current signal to an axial current signal and supplying a resulting first output signal to a first one of the amplifiers,
    a second summer for adding a second radial current signal to the axial current signal and supplying a resulting second output signal to a second one of the amplifiers, the first and second ones of the amplifiers being coupled to neighboring ones of the actuators,
    a first subtractor for subtracting the first radial current signal from the axial current signal and supplying a resulting third output signal to a third one of the amplifiers, the second and third ones of the amplifiers being coupled to neighboring ones of the actuators
    a second subtractor for subtracting the second radial current signal from the axial current signal and supplying a resulting fourth output signal to a fourth one of the amplifiers.

11. The magnetic bearing of claim 9, wherein each stator comprises four actuators, each actuator has first and second windings and each bearing structure further comprises a first amplifier for amplifying a first current signal representative of an axial force and supplying the first current signal to a each of the first windings of the four actuators, a second amplifier for amplifying a second current signal representative of a radial force in a first direction and supplying a positive component of the second current signal to a second winding of a first one of the actuators and a negative component of the second current signal to a second winding of a second one of the actuators, and a third amplifier for amplifying a third current signal representative of a radial force in a second direction and supplying a positive component of the third current signal to a second winding of a third one of the actuators and a negative component of the third current signal to a second winding of a fourth one of the actuators, the second direction being perpendicular to the first direction, the third one of the actuators neighboring the first one and second ones of the actuators.

12. The magnetic bearing of claim 9, further including a computer for converting the common mode axial force command and a plurality of radial force commands into the current signals.

* * * * *